(12) United States Patent
Tallman (10) Patent No.: US 8,386,951 B2
(45) Date of Patent: Feb. 26, 2013

(54) DISPLAY ADJUSTMENT FEATURES (75) Inventor: Tony Tallman, Hopkins, MN (US)

(73) Assignee: Fluke Corporation, Everett, WA (US)

(*) Notice: Subject to any disclaimer, the term of this patent is extended or adjusted under 35 U.S.C. 154(b) by 1396 days.

(21) Appl. No.: 11/537,564

(22) Filed: Sep. 29, 2006

(65) Prior Publication Data
US 2008/0144905 A1 Jun. 19, 2008

(51) Int. Cl.
G06F 3/048 (2006.01)

(52) U.S. Cl. ... 715/771; 715/764; 715/782; 250/339.04; 382/131

(58) Field of Classification Search ........... 715/771; 382/131; 348/164
See application file for complete search history.

(56) References Cited

U.S. PATENT DOCUMENTS

| | | | |
|---|---|---|---|
| 4,023,201 A | 5/1977 | Faulkner | |
| 4,139,862 A | 2/1979 | Haskell et al. | |
| 4,214,164 A | 7/1980 | Traub et al. | |
| 4,806,723 A | 2/1989 | Beynon et al. | |
| 5,265,246 A * | 11/1993 | Li et al. | 707/4 |
| 5,572,312 A | 11/1996 | Karlsson et al. | |
| 5,710,899 A * | 1/1998 | Eick | 715/764 |
| 5,818,951 A | 10/1998 | Schivley | |
| 5,850,531 A * | 12/1998 | Cox et al. | 715/781 |
| 6,104,298 A | 8/2000 | Flanders | |
| 6,288,396 B1 | 9/2001 | Qiang et al. | |
| 6,356,646 B1 | 3/2002 | Spencer | |
| 6,606,115 B1 | 8/2003 | Alicandro et al. | |
| 6,653,939 B2 | 11/2003 | Galloway | |
| 6,766,226 B2 | 7/2004 | Andersen | |
| 6,798,587 B2 | 9/2004 | Irani | |
| 6,901,560 B1 * | 5/2005 | Guerlain et al. | 715/833 |
| 6,922,816 B1 * | 7/2005 | Amin et al. | 715/833 |
| 6,953,932 B2 | 10/2005 | Anderson et al. | |
| 7,080,324 B1 * | 7/2006 | Nelson et al. | 715/771 |
| 7,554,521 B1 * | 6/2009 | Migos et al. | 345/156 |
| 7,765,491 B1 * | 7/2010 | Cotterill | 715/833 |
| 2002/0109096 A1 | 8/2002 | Carter | |
| 2004/0196372 A1 | 10/2004 | Lannestedt | |
| 2005/0089076 A1 | 4/2005 | Lindstrom et al. | |
| 2005/0104884 A1 * | 5/2005 | Iwata et al. | 345/440 |
| 2005/0149877 A1 * | 7/2005 | Rice et al. | 715/764 |
| 2006/0107236 A1 * | 5/2006 | Etgen | 715/833 |

FOREIGN PATENT DOCUMENTS

| | | |
|---|---|---|
| WO | 02/104010 | 12/2002 |
| WO | 03/076884 | 9/2003 |
| WO | 2006/020869 | 9/2006 |

OTHER PUBLICATIONS

IR Flexcam Family User Manual, from Infrared Solutions, Inc., Documents No. 105127, Rev. B, 03.06.

* cited by examiner

Primary Examiner — Tadeese Hailu
Assistant Examiner — Darrin Hope
(74) Attorney, Agent, or Firm — Fredrikson & Byron, P.A.

(57) ABSTRACT

A graphical user interface presents an image of an object coded with values from a sequence of qualitative values, according to a calibration of the qualitative values to a selected range of quantitative values. The interface includes a display adjustment feature, having the sequence of qualitative values superimposed thereon, and at least one moveable marker, which is adapted to select a quantitative value for the selected range of quantitative values.

33 Claims, 5 Drawing Sheets

DISPLAY ADJUSTMENT FEATURES

TECHNICAL FIELD

The present invention pertains to systems and methods incorporating a graphical user interface and more particularly to features of the interface facilitating adjustment of a calibration of a sequence of qualitative values to a range of quantitative values for displaying an image, which is coded with the qualitative values.

BACKGROUND

In many technical fields the visible light spectrum is used to color code images in order to provide for a quick visual analysis, for example, of elevation, stress, strain, or temperature variation over an object or objects captured in the image. The spectrum of colors, as a sequence of qualitative values, is calibrated to a range of values from an overall quantitative scale of values, such that each color corresponds to a particular numeric value, or range of numeric values, within the overall range of the scale. A legend for interpreting such an image, typically including a color bar having the spectrum of colors aligned along the scale of quantitative values, is often displayed alongside the coded image. In some cases, shades of gray or assorted patterns or textures may be substituted for the spectrum of colors as a sequence of qualitative values.

Analysis software programs often provide features, displayed by a graphical user interface, that allow a user to adjust the calibration of the sequence of qualitative values, which code a displayed image. There is a need for graphical user interfaces to provide an intuitive display of these adjustment features in order to facilitate quick and precise adjustments to the calibration.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

Due to the limitations imposed on patent application drawings with respect to color, and for the purpose of clarity in reproduction, a sequence of qualitative values used in FIGS. 1A-B, 2A-B and 3C employs various patterns rather than the more typical colors of the spectrum of visible light. It should be noted that the scope of the present invention is not limited to any particular type of scale of qualitative values, nor to a particular resolution thereof.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention.

Figure 1A:
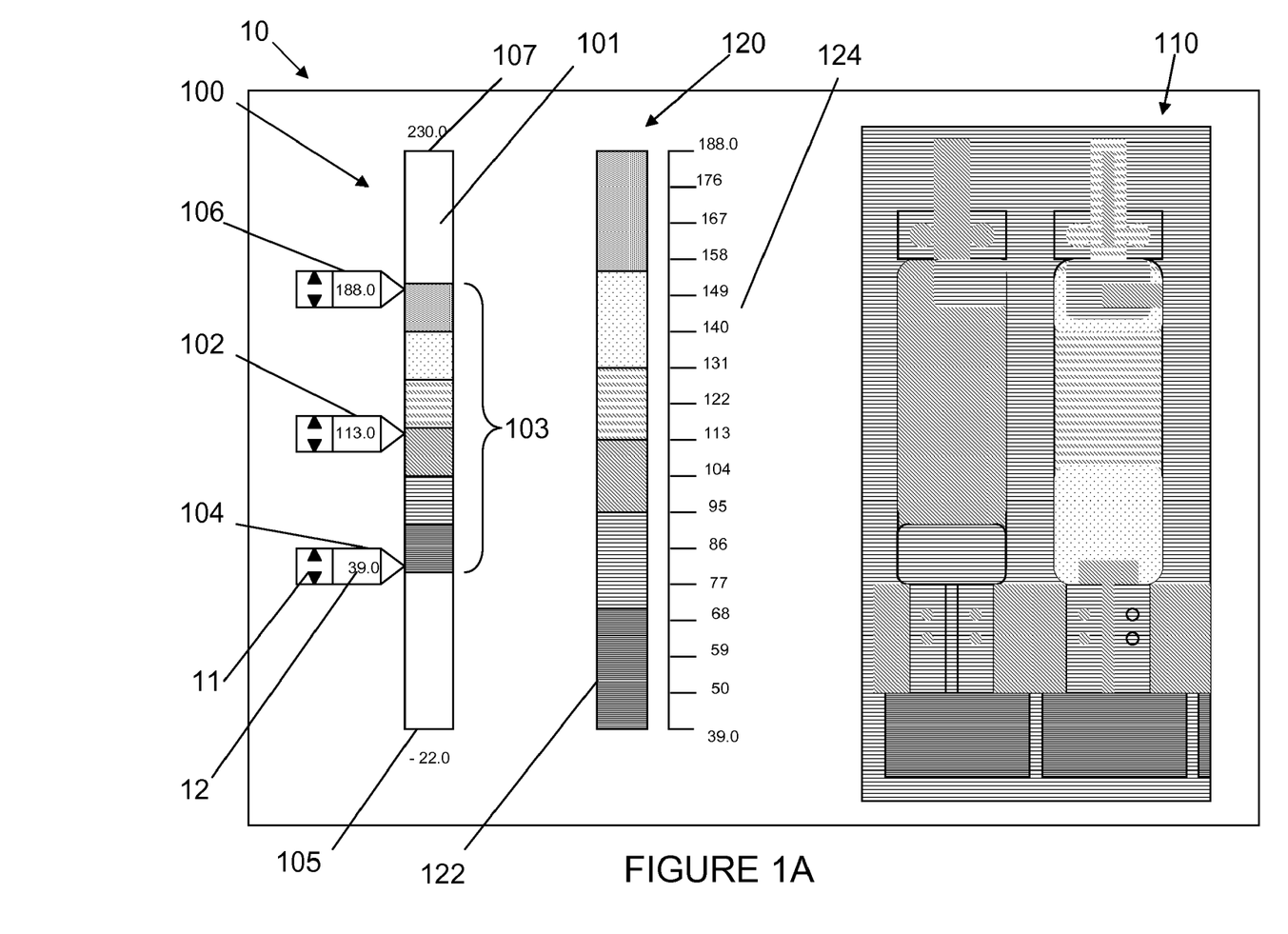
FIGS. 1A-B are schematic representations of a graphical user interface including a display adjustment feature, according to some embodiments of the present invention.
Figure 1B:
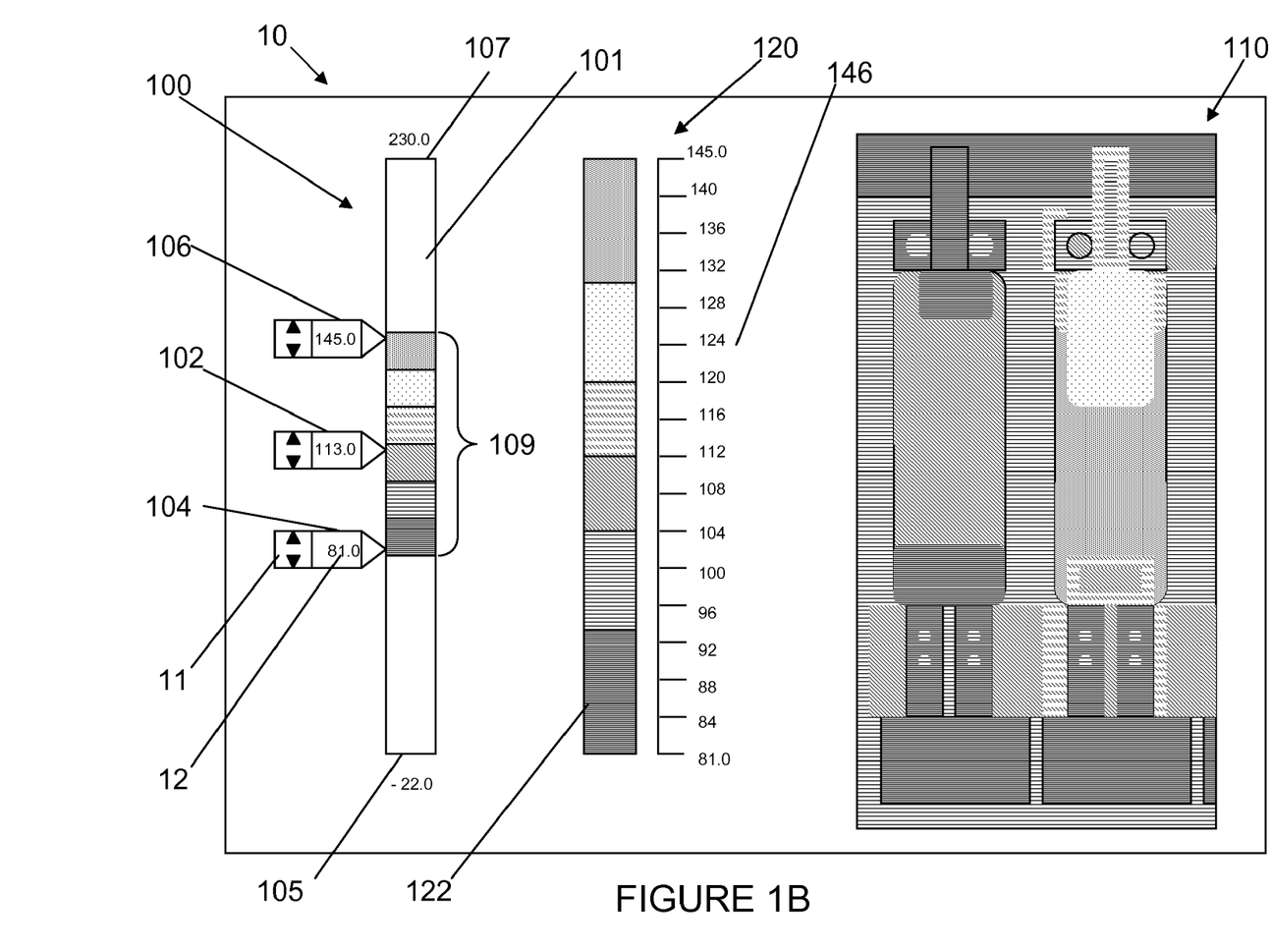
Figure 2A:
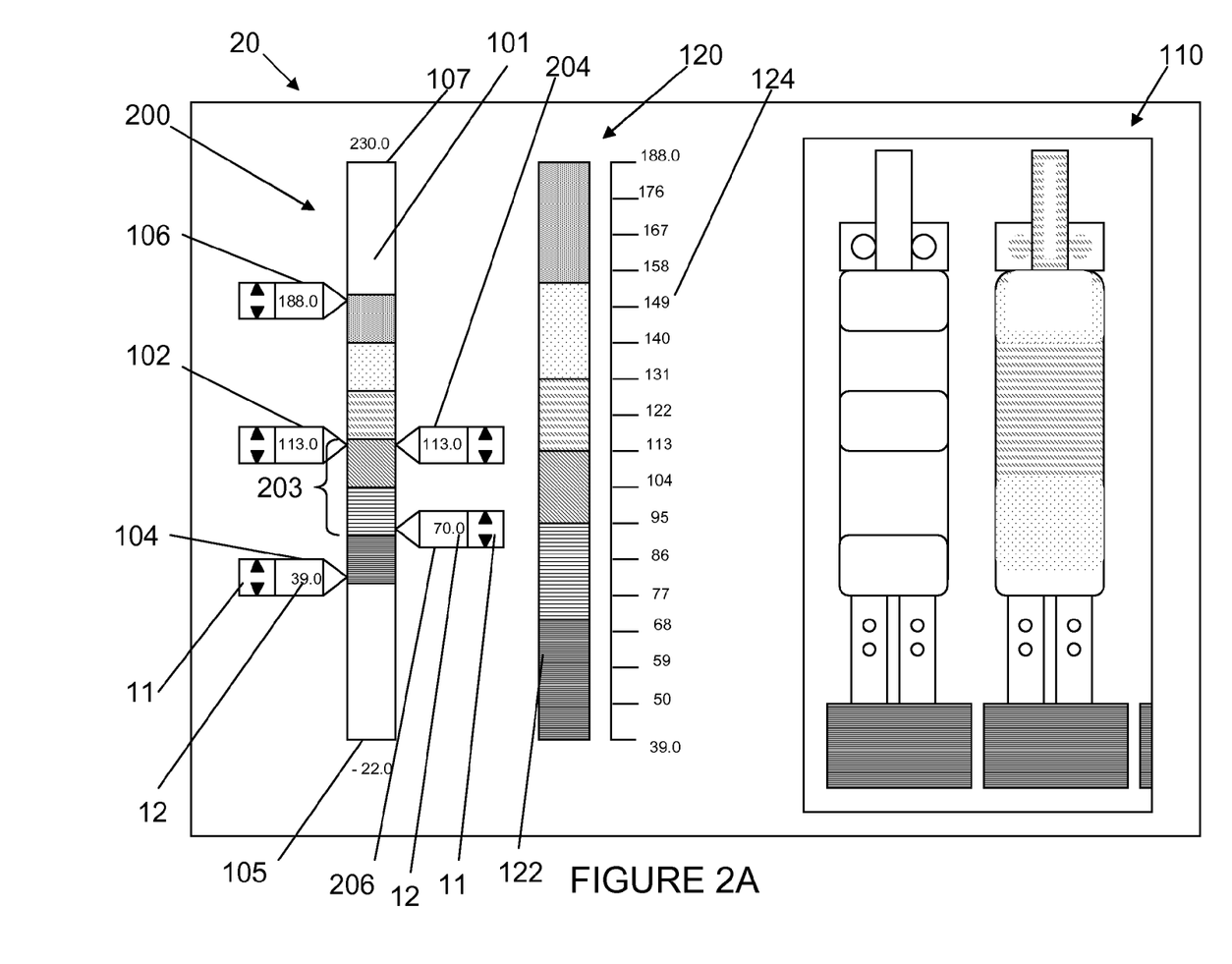
FIGS. 2A-B are schematic representations of a graphical user interface including a display adjustment feature, according to some alternate embodiments of the present invention.
Figure 2B:
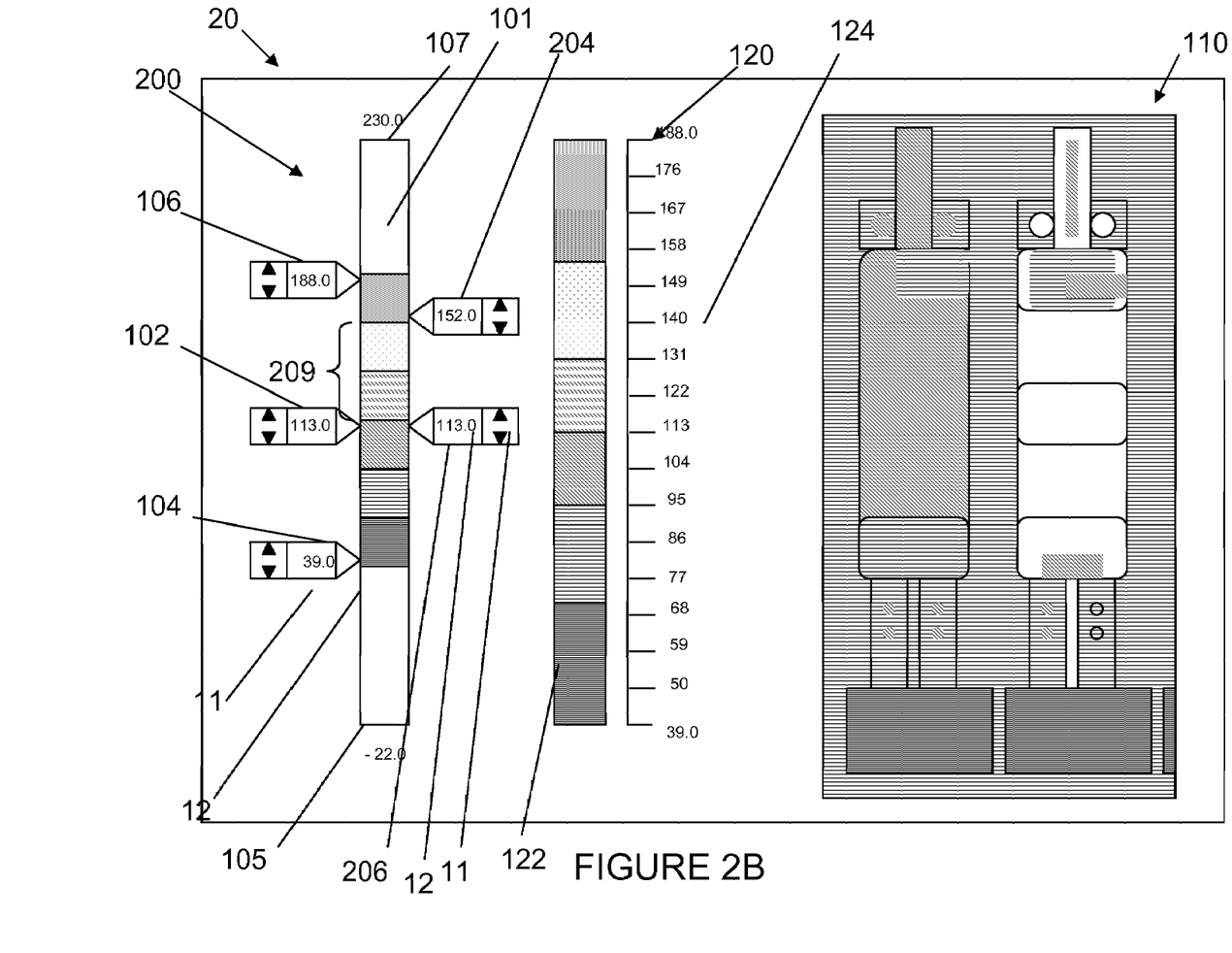

FIGS. 1A-B are schematic representations of a graphical user interface 10 including a display adjustment feature 100, according to some embodiments of the present invention; and FIGS. 2A-B are schematic representations of a graphical user interface 20 including a display adjustment feature 200, according to some alternate embodiments of the present invention. FIGS. 1A-B and 2A-B illustrate each interface 10, 20 further including an image 110 of transformer fuses which are coded with values from a sequence of qualitative values, for analysis, according to various settings of adjustment features 100, 200, which dictate a calibration of the qualitative values to a range of quantitative values. According to an exemplary embodiment, image 110 was generated by an infrared camera, for example, camera 60 illustrated in FIGS. 3A-B, for a temperature profile analysis of the fuses.

According to the illustrated embodiments, display adjustment features 100, 200 each include a display feature, for example a bar 101, having the sequence of qualitative values superimposed thereon, and moveable markers 102, 104 and 106 disposed alongside bar 101; each marker 102, 104, 106 corresponds to a qualitative value on bar 101, which is identified with a user-selected quantitative value displayed in a window 12 of each marker 102, 104, 106. With reference to FIGS. 1A-B and 2A-B, markers 104 and 106 indicate a first calibration range 103 for the sequence of qualitative values, for example, between approximately 39° F. and approximately 188° F.; and, with reference to FIG. 1B, markers 104 and 106 indicate a second calibration range 109 for the sequence of qualitative values, for example, between approximately 81° F. and approximately 145° F. FIGS. 1A-B and 2A-B show bar 101 including a first end 105 that corresponds to a minimum value, i.e. −22.0° F., of an overall quantitative scale of values, from which the range of quantitative values is selected, and a second end 107 that corresponds to a maximum value, i.e. 230.0° F., of the overall quantitative scale of values, however, according to alternate embodiments, bar 101 may not indicate the minimum and maximum values of the overall quantitative scale of values.

FIGS. 1A-B and 2A-B further illustrate interfaces 10, 20 displaying a legend 120 that includes a bar 122 on which the sequence of qualitative values is superimposed. The sequence of qualitative values is shown scaled between ends of bar 122 according to the range of quantitative values selected for calibration of the qualitative values, which is shown on the corresponding bar 101. For example, in FIGS. 1A and 2A-B, the sequence of qualitative values is scaled along legend bar 122 according to selected calibration range 103 such that the lower end of legend bar 122 corresponds to the minimum value of 39° F., and the upper end to the maximum value of 188° F.; while in FIG. 1B, the sequence of qualitative values is scaled according to selected calibration range 109 such that the lower end of legend bar 122 corresponds to the minimum value of 81° F., and the upper end to the maximum value of 145° F. According to the illustrated embodiments, each legend 120 further includes a numerical scale 124, 146 extending alongside bar 122 to further facilitate interpretation of coded image 110 by reference to legend 120.

According to preferred embodiments of the present invention, one or more of markers 102, 104, 106, include at least one interactive element facilitating precise selection of a quantitative value for a selected range of quantitative values, for example, ranges 103 and 109, to which the sequence of qualitative values is calibrated. FIGS. 1A-B and 2A-B illustrate each of markers 102, 104, 106 including a button 11

Figure 3A:
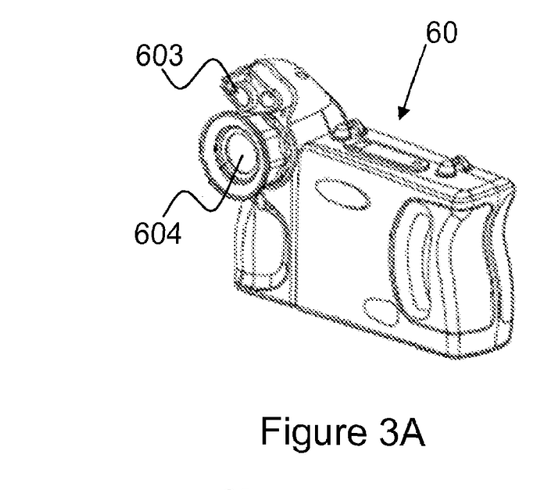
FIGS. 3A-B are perspective views of an exemplary infrared camera included in a system, according to some embodiments of the present invention.
Figure 3B:
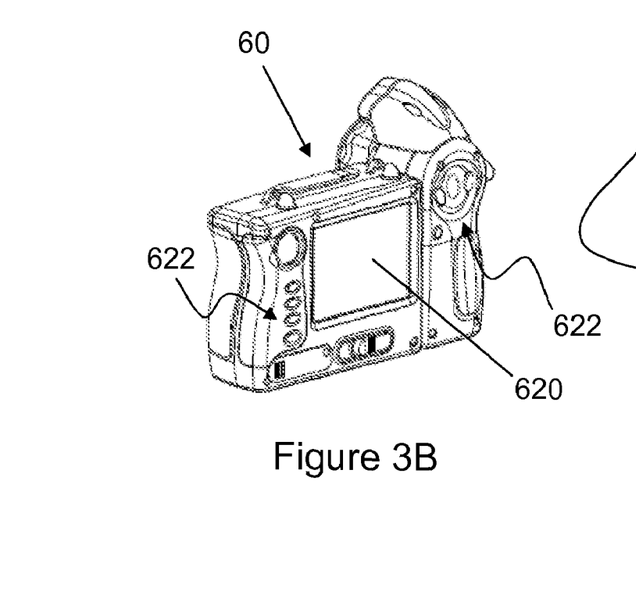
Figure 3C:
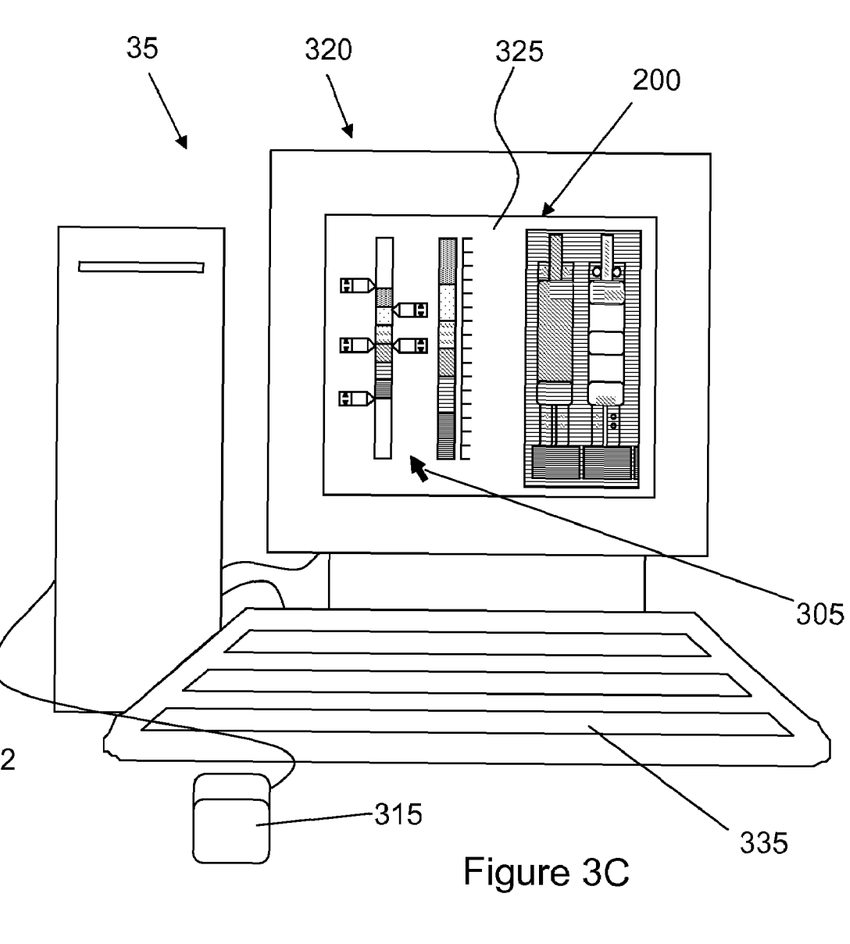
FIG. 3C is a schematic representation of an exemplary computer included in a system, according to some embodiments of the present invention.

(represented by upward and downward pointing triangles), which serves as the interactive element which a user may engage, or activate, to precisely select a quantitative value. According to an exemplary embodiment, a user engages button 11, for example, via a touch screen 325 or a mouse 315 that moves a cursor 305(FIG. 3C), to adjust the quantitative value to the desired value by incremental or decremental changes, one digit at a time, the digit having a pre-programmed order of magnitude, for example, one hundredth, one tenth, one, ten, etc. Thus, a user may move, for example, via 'click and drag' of the mouse-activated cursor, any of markers 102, 104, 106 alongside bar 101 to select an approximate quantitative value, and then 'tune' the value to a precise selection using button 11. According to some embodiments of the present invention, window 12, either in addition to button 11, or as an alternative to button 11, is interactive for data entry, and a user may precisely select a quantitative value by entering a precise number into window 12, for example, via a key board 335 (FIG. 3C).

FIGS. 1A-B and 2A-B show marker 102 disposed between markers 104 and 106 to indicate a mean of the minimum and maximum quantitative values that define ranges 103 and 109, shown in FIGS. 1A-B, or the respective ranges between markers 104, 106 shown in FIGS. 2A-B. According to some methods of the present invention, the mean quantitative value is precisely selected, for example, using an interactive element of marker 102, as described above, and markers 104 and 106 automatically move into position to define the range about the selected mean, according to a predefined range, or what is called a 'span' by those skilled in the art of infrared imaging. According to alternate methods of the invention, one or both of the minimum and maximum values for the quantitative range, or span, are precisely selected, via an interactive element of one or both of markers 104, 106, and marker 102 automatically moves to indicate the mean of the selected values. For either of the above methods, embodiments of those markers which move automatically need not include an interactive element for precise selection of quantitative values, for example, button 11. Furthermore, the scope of the present invention is not limited to any particular relative movements of moveable markers; any or all of markers 102, 104 and 106 may be caused to move independently of one another according to various embodiments of the present invention.

FIGS. 2A-B illustrate display adjustment feature 200 including moveable markers 204 and 206, in addition to markers 102, 104, 106. According to some embodiments, markers 204 and 206 may be engaged to select a sub-range, for example, of the range (e.g., 103 in FIGS. 1A-B) defined by markers 104 and 106; FIG. 2A shows markers 204 and 206 defining a sub-range 203, and FIG. 2B shows markers 204 and 206 defining a sub-range 209. With reference to coded image 110, in each of FIGS. 2A-B, it should be appreciated that each of sub-ranges 203, 209 defines a different portion of the sequence of qualitative values that is removed from image 110; for example, in FIG. 2A, the removed portion corresponds to temperatures between approximately 70° F. and approximately 113° F., and, in FIG. 2B, the removed portion corresponds to temperatures between approximately 113° F. and approximately 152° F. FIGS. 2A-B show image 110 as a composite image including two parts: a first part that is coded, and a second part that is un-coded; the un-coded part corresponds to the respective sub-range 203, 209 and presents, for example, visible-light imagery/data (as opposed to color-coded infrared data) from those regions of the image having temperature data within the respective sub-range. Alternately, the entirety of the un-coded portion of image 110 may be overlaid by a qualitative value not included in the sequence of qualitative values. Although not shown, portions of display bar 101 corresponding to selected sub-ranges, i.e. sub-ranges 203 and 209, may be transparent if the un-coded portion of image is representing visible-light imagery, or, alternatively, is overlaid with the qualitative value that is used for the un-coded portion of image 110.

According to the illustrated embodiments, markers 204, 206 provide an option for an analyst of coded image 110 to 'turn off' a portion of the sequence of qualitative values, which is calibrated to the selected range 103, in order to focus his attention to areas of image 110 coded for temperatures within targeted sub-ranges, for example, those disposed on either side of sub-ranges 203 and 209 as illustrated. FIGS. 2A-B further illustrate each of markers 204 and 206 including button 11, as an interactive element allowing the analyst to precisely select quantitative values defining sub-ranges, i.e. sub-ranges 203 and 209, and window 12, in which a number corresponding to the selected quantitative value is displayed. As with markers 102, 104, 106, window 12 of one or both of markers 204, 206 may also be interactive to receive entry of numbers for the precise selection of quantitative values, as previously described.

As previously mentioned, one example of a type of analysis facilitated by user interfaces 10, 20 of FIGS. 1A-B and 2A-B is a temperature profile analysis of an object or scene, for example, the fuses of image 110, as captured by an infrared camera. FIGS. 3A-B are perspective views of an exemplary infrared camera included in a system, according to some embodiments of the present invention. FIGS. 3A-B illustrate camera 60 including both an infrared lens 604 and a visible-light lens 603. Thus, camera 60 has the capacity to generate blended, or composite, images, for example, similar to image 110 as illustrated in FIGS. 2A-B, and to display these images on a screen 620, which is shown along a backside of camera 60 in FIG. 6B. FIG. 6B further illustrates various user controls 622, which may be used, in conjunction with interfaces 10, 20 displayed on screen 620, to, among other functions, select temperature ranges for infrared coloring, or coding, of captured images. According to preferred embodiments of the present invention, camera 60 includes capacity to transfer, either via a cable connection or wirelessly, data associated with the coded image to a computer, for example, computer 35 illustrated in FIG. 3C. FIG. 3C illustrates computer 35 including a monitor 320, on which graphical user interface 200 is presented, and the elements useful for engaging interactive elements of interface 200, as previously described, namely, cursor 305, touch screen 325, mouse 315 and keyboard 335.

A particular infrared camera system, into which embodiments of the present invention may be incorporated, is the IR FLEXCAM® system including SmartView® software, available from Infrared Solutions, Inc.—a Fluke Company. This system creates a composite image of an object or scene in which the infrared thermal image, i.e. colors arranged in a particular sequence and calibrated to a selected temperature scale using radiometric techniques, is superimposed over a corresponding visible light image of the same scene; the system further provides a "color alarm mode" that allows a user of the system to select one or more temperature ranges of interest so that only the visible light portion of the object or scene is displayed for those parts of the image that are not within the selected ranges. This color alarm mode is described in co-pending and commonly-assigned U.S. patent application Ser. No. 11/294,752, entitled, VISIBLE LIGHT AND COMBINED IMAGE CAMERA WITH A LASER POINTER, which is hereby incorporated by reference, in its entirety.

In the foregoing detailed description, the invention has been described with reference to specific embodiments. However, it may be appreciated that various modifications and changes can be made without departing from the scope of the invention as set forth in the appended claims. For example, certain embodiments and methods of the present invention are described herein in the context of an infrared camera system and associated temperature profile analysis, but it is contemplated that any type of analytical system that has the capacity to generate images of objects, as described herein, either by mathematical calculation, or by direct measurement and collection methods, or by a combination thereof, may incorporate embodiments and methods of the present invention.

The invention claimed is:

1. An adjustment apparatus displayed through a graphical user interface using a computer, the interface also displaying an image of an object, wherein at least a portion of the image is coded with values from a sequence of qualitative values, the adjustment apparatus comprising:
    a display adjustment feature providing an overall range of selectable quantitative values using the computer, from an overall minimum selectable quantitative value to an overall maximum selectable quantitative value, and having an entirety of the sequence of qualitative values superimposed thereon according to a selected range of quantitative values from within the overall range of selectable quantitative values;
    a moveable marker disposed alongside the display adjustment feature and being engageable by a user, using the computer, to select, from the display adjustment feature, a quantitative value from the overall range of selectable quantitative values provided by the display adjustment feature, the selected quantitative value defining the selected range of quantitative values to be associated with the entirety of the sequence of qualitative values, such that the entirety of the sequence of qualitative values is calibrated to the selected range of quantitative values for the coding of the image displayed by the interface;
    a legend having the entirety of the calibrated sequence of qualitative values superimposed thereon using the computer, the legend including a first end corresponding to a minimum quantitative value of the selected range of quantitative values and a second end corresponding to a maximum quantitative value of the selected range of quantitative values; and
    a numerical scale corresponding to the selected range of quantitative values and extending alongside the legend;
    wherein a position of the moveable marker alongside the display adjustment feature corresponds to a particular qualitative value of the sequence of qualitative values, the particular qualitative value corresponding to the selected quantitative value.

2. The apparatus of claim 1, wherein the marker includes at least one interactive element that is engaged by the user to precisely select the quantitative value from the overall range of quantitative values.

3. The apparatus of claim 2, wherein the at least one interactive element of the marker includes a button facilitating incremental and decremental changes within the overall range of selectable quantitative values, to select the quantitative value.

4. The apparatus of claim 3, wherein the at least one interactive element of the marker further includes a window displaying a number corresponding to the selected quantitative value.

5. The apparatus of claim 4, wherein the window is interactive such that the number may be edited within the window.

6. The apparatus of claim 2, wherein the at least one interactive element of the marker includes a data entry window for the user to enter a number to select the quantitative value.

7. The apparatus of claim 1, wherein the quantitative value selected by the user is one of: a mean value for the selected range of quantitative values, a maximum value for the selected range, a minimum value for the selected range, a maximum value for a sub-range within the selected range, and a minimum value for the sub-range within the selected range.

8. The apparatus of claim 7, wherein the moveable marker is a first marker; and further comprising a second moveable marker disposed alongside the display adjustment feature and being engageable by the user to select, from the display adjustment feature, a second quantitative value from the overall range of selectable quantitative values in order to further define the selected range of quantitative values to be associated with the entire sequence of qualitative values, the second quantitative value being another of: the mean value for the selected range of quantitative values, the maximum value for the selected range of quantitative values, the minimum value for the selected range, the maximum value for the sub-range within the selected range, and the minimum value for the sub-range within the selected range, and wherein a position of the second marker alongside the display adjustment feature corresponds to the second selected quantitative value.

9. The apparatus of claim 8, wherein each of the first and second markers includes at least one interactive element that is engaged by the user to precisely select the first and second quantitative value, respectively.

10. The apparatus of claim 9, wherein the at least one interactive element of each of the first and second markers includes a button facilitating incremental and decremental changes within the overall range of selectable quantitative values, to select each of the first and second quantitative values, respectively.

11. The apparatus of claim 10, wherein the at least one interactive element of each of the first and second markers further includes a window displaying a number corresponding to each of the first and second selected quantitative values, respectively.

12. The apparatus of claim 11, wherein each of the windows is interactive such that the corresponding number may be edited within each window.

13. The apparatus of claim 10, wherein the at least one interactive element of each of the first and second markers includes a data entry window for entering each of the first and second selected quantitative values, respectively.

14. The apparatus of claim 9, further comprising:
    a third moveable marker disposed alongside the display adjustment feature using the computer, between the first marker and the second marker; and
    a fourth moveable marker disposed alongside the display adjustment feature using the computer, between the first marker and the second marker;
    wherein the third and fourth markers are each engageable by the user, using the computer, to select, from the display adjustment feature, a third quantitative value and a fourth quantitative value, respectively, from within the selected range of quantitative values to define a sub-range of corresponding qualitative values from within the calibrated sequence of qualitative values, and thereby remove the sub-range of corresponding qualitative values from the coding of the image.

15. The apparatus of claim 14, wherein each of the third and fourth markers includes at least one interactive element that is engaged by the user to precisely select the third and fourth quantitative values, respectively.

16. The apparatus of claim 1, further comprising another moveable marker disposed alongside the display adjustment feature using the computer; and wherein the other marker automatically moves to another position along the display adjustment feature, according to the selection of the quantitative value, the other position corresponding to another particular qualitative value, the other particular qualitative value corresponding to another quantitative value within the selected range of quantitative values.

17. The apparatus of claim 1, wherein:
the image is captured by an infrared camera;
the sequence of qualitative values comprises a sequence of colors; and
the overall range of selectable quantitative values corresponds to a range of temperatures.

18. The apparatus of claim 1, wherein the display adjustment feature comprises a bar and the moveable marker is disposed alongside the bar.

19. An infrared camera system being programmed to execute a method for presenting, through a user interface of the system, an adjustment apparatus and a coded image of an object, the image being captured by the system and coded with values from a sequence of qualitative values, the adjustment apparatus for adjusting the coding of the image, and the method comprising:
displaying an overall range of selectable temperature values on a display adjustment feature of the adjustment apparatus, the overall range of selectable temperature values being defined by an overall minimum selectable temperature and an overall maximum selectable temperature;
displaying a moveable marker in proximity to the display adjustment feature, the moveable marker being engageable by a user to select a temperature value from the overall range of selectable temperature values, in order to define a selected range of temperature values from within the overall range;
calibrating the sequence of qualitative values to the selected range of temperature values;
displaying an entirety of the calibrated sequence of qualitative values on the display adjustment feature in between the overall minimum selectable temperature and the overall maximum selectable temperature;
displaying a legend alongside the display adjustment feature, a first end of the legend corresponding to a minimum temperature value of the selected range, a second end of the legend corresponding to a maximum temperature value of the selected range, and the entire calibrated sequence of qualitative values being superimposed on the legend between the first and second ends thereof; and
adjusting the coding of the coded image, according to the calibrated sequence of qualitative values;
wherein the moveable marker moves to a position along the display feature that corresponds to a particular qualitative value of the displayed sequence of qualitative values, the particular qualitative value corresponding to the selected temperature value.

20. The system of claim 19, wherein the moveable marker includes an interactive button engageable by the user to make incremental or decremental changes, within the overall range of temperature values, in order to precisely select the temperature value.

21. The system of claim 19, wherein the moveable marker includes an interactive window engageable by the user to enter a number for selecting the temperature value.

22. The system of claim 19, wherein the method further comprises displaying a number within a window of the moveable marker, the number corresponding to the temperature value selected by the user.

23. The system of claim 19, wherein the temperature value selected by the user is one of: a mean value for the selected range of temperature values, a maximum value for the selected range, a minimum value for the selected range, a maximum value for a sub-range within the selected range, and a minimum value for the sub-range within the selected range.

24. The system of claim 19, wherein the moveable marker is a first marker, the temperature value selected by the user is a first temperature value, and the position to which the marker moves is a first position; and the method further comprises displaying a second moveable marker in proximity to the display adjustment feature, the second marker being engageable by the user to select a second temperature value from the overall range of temperature values in order to further define the selected range of temperature values, and the second marker moving to a second position along the display adjustment feature, the second position corresponding to another particular qualitative value of the displayed sequence of qualitative values, the other particular qualitative value corresponding to the second temperature selected by the user.

25. The system of claim 24, wherein the second temperature value selected by the user is one of: a mean value for the selected range of temperature values, a maximum value for the selected range, a minimum value for the selected range, a maximum value for a sub-range within the selected range, and a minimum value for the sub-range within the selected range.

26. The system of claim 24, wherein the method further comprises:
displaying a third moveable marker and a fourth moveable marker, both in proximity to the display adjustment feature and between the first and second markers, each of the third and fourth markers being engageable by the user to select a third temperature value and a fourth temperature value, respectively, from within the overall range of selectable temperature values, in order to define a selected sub-range of qualitative values within the calibrated sequence of qualitative values; and
adjusting the display of the coded image to remove coding that corresponds to the selected sub-range.

27. The system of claim 19, wherein the method further comprises displaying another moveable marker in proximity to the display adjustment feature, the other marker moving to another position along the display adjustment feature, according to the user's selection of the temperature value, the other position corresponding to another particular qualitative value of the displayed sequence of qualitative values, the other particular qualitative value corresponding to another temperature value within the selected range of temperature values.

28. An infrared camera system being programmed to execute a method for presenting, through a user interface of the system, an adjustment apparatus and a coded image of an object, the image being captured by the system and coded with values from a sequence of qualitative values, the adjustment apparatus for adjusting the coding of the image, and the method comprising:

displaying an overall range of selectable temperature values on a display adjustment feature of the adjustment apparatus;

displaying first and second moveable markers in proximity to the display adjustment feature, the moveable markers being engageable by a user to select first and second temperature values, respectively, from the overall range of temperature values, the first, in order to define a selected range of temperature values from within the overall range, and the second, in order to define a selected sub-range of temperature values from within the selected range;

calibrating the sequence of qualitative values to the selected range of temperature values;

adjusting the coding of the image, according to the calibrated sequence of qualitative values, and to remove a portion of the coding from the image, the portion of the coding corresponding to a portion of the calibrated sequence of qualitative values that also corresponds to the selected sub-range of temperature values; and displaying the calibrated sequence of qualitative values on the display adjustment feature, the sequence either including or not including the portion that corresponds to the selected sub-range; and wherein each of the first and second markers move to a position along the display adjustment feature that corresponds to a particular qualitative value having been calibrated to the corresponding selected temperature.

29. The system of claim 28, wherein each movable marker includes an interactive button engageable by the user to make incremental or decremental changes, within the overall range of temperature values, in order to precisely select the corresponding first and second temperature value.

30. The system of claim 28, wherein each movable marker includes an interactive window engageable by the user to enter a number for selecting the corresponding first and second temperature value.

31. An infrared camera system being programmed to execute a method for presenting, through a user interface of the system, an adjustment apparatus and a coded image of an object, the image being captured by the system and coded with values from a sequence of qualitative values, the adjustment apparatus for adjusting the coding of the image, and the method comprising:

displaying an overall range of selectable temperature values on a display adjustment feature of the adjustment apparatus;

displaying a moveable marker in proximity to the display adjustment feature, the moveable marker being engageable by a user to select a temperature value from the overall range of temperature values in order to define a selected range of temperature values from within the overall range;

calibrating the sequence of qualitative values to the selected range of temperature values;

adjusting the coding of the image, according to the calibrated sequence of qualitative values; and displaying an entirety of the calibrated sequence of qualitative values on the display adjustment feature; and wherein the temperature value selectable by the moveable marker is a mean value of the selected range of temperature values and the selected range has a pre-defined span.

32. The system of claim 31, wherein the movable marker includes an interactive button engageable by the user to make incremental or decremental changes, within the overall range of temperature values, in order to precisely select the temperature value.

33. The system of claim 31, wherein the movable marker includes an interactive window engageable by the user to enter a number for selecting the temperature value.

* * * * *